US010019021B1

(12) United States Patent
Lee et al.

(10) Patent No.: US 10,019,021 B1
(45) Date of Patent: Jul. 10, 2018

(54) VOLTAGE SETTLING DETECTION FOR SWITCHING REGULATORS

(71) Applicant: Qualcomm Incorporated, San Diego, CA (US)

(72) Inventors: Gordon Lee, Gilbert, AZ (US); Marko Koski, Chandler, AZ (US); Zdravko Lukic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/712,488

(22) Filed: Sep. 22, 2017

(51) Int. Cl.
*G05F 1/00* (2006.01)
*G05F 1/565* (2006.01)
*H02M 1/00* (2006.01)
*G06F 1/08* (2006.01)
*G05F 1/575* (2006.01)
*G06F 1/30* (2006.01)

(52) U.S. Cl.
CPC ............ *G05F 1/565* (2013.01); *G05F 1/575* (2013.01); *G06F 1/08* (2013.01); *G06F 1/305* (2013.01)

(58) Field of Classification Search
CPC .................................. G05F 1/465; G05F 1/575
USPC ........ 323/241–243, 246, 273–275, 283–285, 323/288
See application file for complete search history.

(56) References Cited

U.S. PATENT DOCUMENTS

| | | | | |
|---|---|---|---|---|
| 7,446,520 B2* | 11/2008 | Hung | ..................... | H02M 3/158 323/284 |
| 7,541,795 B1* | 6/2009 | Smith | ..................... | H02M 1/32 323/283 |
| 8,471,543 B2* | 6/2013 | Nakazono | ........... | H02M 3/1588 323/283 |
| 8,710,815 B2* | 4/2014 | Feng | ..................... | H02M 3/156 323/271 |
| 8,786,268 B2* | 7/2014 | Li | ..................... | H02M 3/156 323/283 |
| 8,860,595 B1* | 10/2014 | Fan | ..................... | H02M 7/02 323/271 |
| 9,450,492 B1 | 9/2016 | Bizjak et al. | | |
| 2007/0024260 A1* | 2/2007 | Matsuo | ................. | H02M 3/156 323/283 |
| 2009/0115392 A1* | 5/2009 | Shimizu | ................ | H02M 3/156 323/283 |

(Continued)

FOREIGN PATENT DOCUMENTS

CN 106873694 A 6/2017

*Primary Examiner* — Gary Nash

(74) *Attorney, Agent, or Firm* — Colby Nipper/Qualcomm

(57) ABSTRACT

The present disclosure describes aspects of voltage settling detection for switching regulators. In some aspects, an integrated circuit for controlling a switching regulator includes a modulator having an output coupled to switch drive circuitry of the switching regulator. A digital-to-analog converter (DAC) has a first output coupled to an input of the modulator and a second output configured to indicate when a digital-to-analog conversion is complete. A voltage settling detector is configured to receive, from the second output of DAC, an indication that the digital-to-analog conversion is complete and detect a signal transition at the output of the modulator. Based on the indication and the signal transition, the voltage settling detector can provide a status indication for the switching regulator. By so doing, the voltage settling detector may indicate that an output voltage of the switching regulator is proximate a target output voltage level set by the DAC.

30 Claims, 10 Drawing Sheets

(56) References Cited

U.S. PATENT DOCUMENTS

2009/0243575 A1* 10/2009 Akiyama .............. H02M 3/156
                                                    323/282
2015/0200598 A1   7/2015 Kha
2016/0259355 A1*  9/2016 Farber .................. H03K 5/2481
2016/0342167 A1  11/2016 Zhou et al.
2016/0359428 A1  12/2016 Bae et al.

* cited by examiner

VOLTAGE SETTLING DETECTION FOR SWITCHING REGULATORS

TECHNICAL FIELD

This disclosure relates generally to power regulation circuitry, and more specifically to power regulation circuits comprising switching regulators.

BACKGROUND

Many electronic devices include complex systems for processing, storing, and displaying data. One of these systems regulates power, such as through power regulation circuits. These power regulation circuits regulate battery or external power, including through use of lower-voltage power rails from which components of the device operate. Some components of the device, however, are able to operate across a wide range of power states or performance profiles to improve user experience and device performance. For example, a graphics processor of the device may operate at increased voltage and frequency levels to render visual content at a higher frame-rate in order to display more realistic graphical effects. Alternately, the graphics processor may operate at reduced voltage and frequency levels to conserve power, such as to extend device runtime when operating from battery power so the user can watch an entire movie without recharging the device.

Adjusting voltage levels of the power regulation circuits, however, often requires careful coordination between the regulation circuits and the components that draw power from those regulation circuits. In some cases, a voltage level of a power regulation circuit is increased or decreased before a component is permitted to draw operating current from the power regulation circuit. In such cases, the voltage level of the regulation circuit may float or decay slowly due to a lack of load on the output of the regulation circuit. To address this issue, the power regulation circuit may be programmed to wait a predetermined amount of time before indicating that the voltage level of the power regulation circuit has been increased or decreased to support operation of the component.

Aside from not actually knowing if the voltage level is correct during or after the wait time, the predetermined amount of wait time introduces other issues that affect device performance. For example, if the predetermined wait time is too short, application of the component's current load can drag a floating voltage level at the output of the power regulation circuit down rapidly resulting component brown-out or shutdown. In other cases, a predetermined wait time that is too long allows the power regulation circuit to operate without providing power to the load, which wastes power of the device as the power regulation circuit is allowed to idle. As such, these time-based methods for managing voltage adjustments of power regulation circuits can impair device performance in numerous ways.

This description of related art is provided for the purpose of generally presenting a context for the disclosure that follows. Unless indicated otherwise herein, concepts described in this section are not prior art to this disclosure and are not admitted to be prior art by inclusion herein.

SUMMARY

The present disclosure describes aspects of settling time detection for switching regulators. In some aspects, an integrated circuit for controlling a switching regulator includes a modulator having an output coupled to drive circuitry of switches that regulate output power. A digital-to-analog converter (DAC) of the switching regulator has a first output coupled to an input of the modulator and a second output configured to indicate when a digital-to-analog conversion of the DAC is complete. A voltage settling detector is configured to receive, from the second output of DAC, an indication that the digital-to-analog conversion is complete and detect a signal transition at the output of the modulator. Based on the indication and the signal transition, the voltage settling detector provides a status indication for the switching regulator (e.g., output voltage ready). By so doing, the voltage settling detector may indicate that an output voltage of the switching regulator is at an approximate target output voltage level instead of waiting a predetermined amount of time, which may be too long or too short in duration based on loading of the switching regulator.

The foregoing summary is provided to briefly introduce some of the aspects described herein. This summary is not intended to identify key or essential features of these or other aspects that are further described throughout the disclosure.

BRIEF DESCRIPTION OF DRAWINGS

The details of various aspects are set forth in the accompanying figures and the detailed description that follows. In the figures, the left-most digit of a reference number identifies the figure in which the reference number first appears. The use of the same reference numbers in different instances in the description or the figures may indicate like elements.

DETAILED DESCRIPTION

Figure 1:
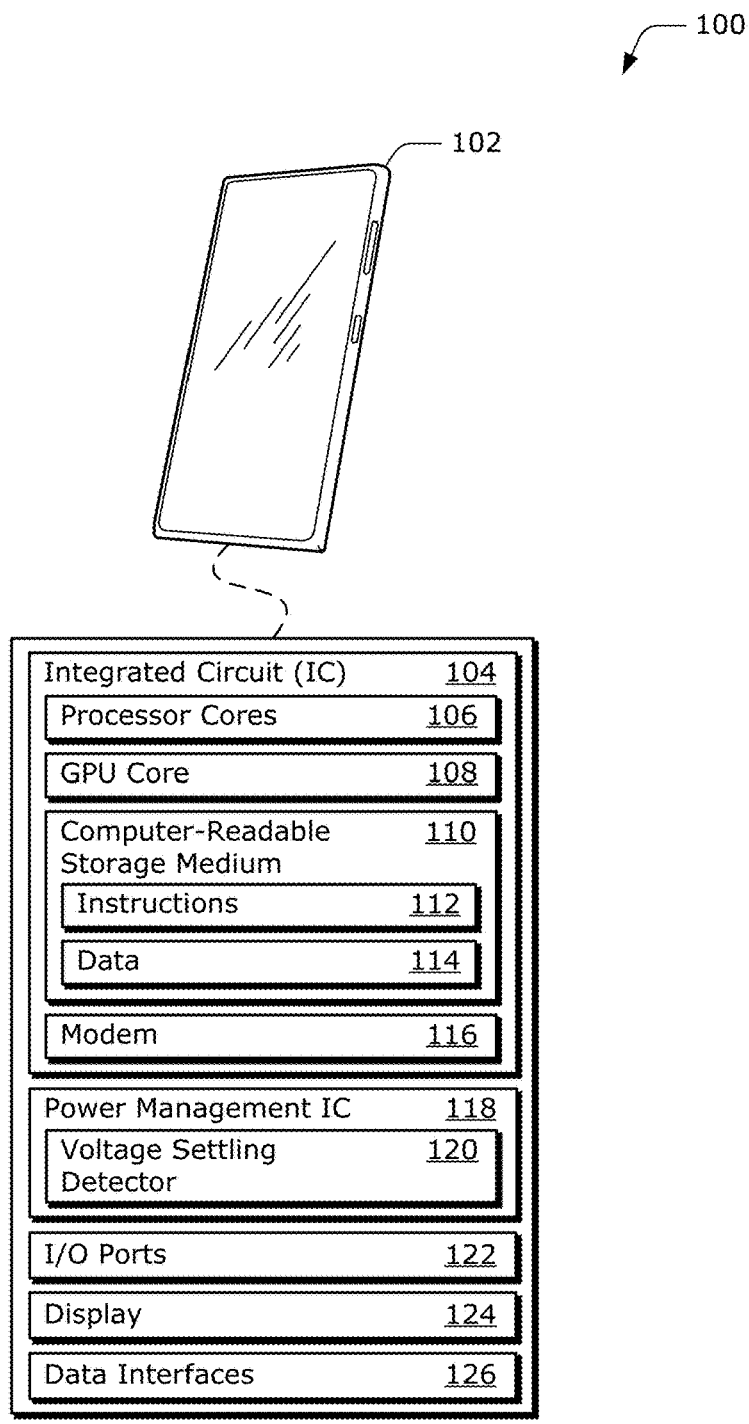
FIG. 1 illustrates an example environment that includes a computing device in which aspects of voltage settling detection can be implemented.

Switching-regulator circuits often implement time-based schemes to coordinate bring-up or adjustment of an output voltage of a switching regulator. For example, before a load is allowed to draw power from a switching-regulator circuit, an output voltage level of the switching-regulator circuit can be configured to a particular voltage level. To prevent a component from drawing power at an incorrect voltage level, a delay of a predetermined amount of time can be implemented before power is drawn to grant the switching regulator's output sufficient time to settle at the particular voltage level.

Without a load connected, or at minimal loading, however, the output voltage of the switching-regulator circuit may float or decay slowly toward the particular voltage level. As such, components may attempt to draw power from the switching-regulator circuit before the output voltage level has settled, risking brownout or shut down when the output voltage is quickly pulled down by the power draw. In cases in which the delay of power draw is too long, the component begins drawing power long after the output voltage level has settled, resulting in wasted power while the switching-regulator circuit idles. As such, time-based schemes for delaying power draw may result in power system issues or wasted power, both of which impair device performance.

Additionally, some switching-regulator circuits calibrate an output voltage of a switching regulator, such as at start up or after an output voltage is adjusted. For example, the output voltage of the switching regulator can be precisely measured and compensated for operating conditions that include temperature, semiconductor process variations, or other similar conditions. In some cases, the output voltage is reduced to minimum operating threshold of a component (e.g., processor core) to conserve power consumed by the component. If a calibration process is performed too early, such as when a time-based delay for output voltage is too short and the output voltage is floating above the set output voltage level, the associated compensation or adjustment of the output voltage will be incorrect. Once the component begins to draw power, the incorrectly compensated output voltage may then droop below minimum operating thresholds and cause the component to malfunction or shutdown. These are but a few examples of how time-based power sequencing for switching regulators negatively affect device performance and impair a user's experience.

This disclosure describes aspects of voltage settling detection for switching regulators, which may address the aforementioned issues associated with time-based power sequencing of switching regulators. In some aspects, an integrated circuit for controlling a switching regulator includes a modulator (e.g., pulse-width modulation (PWM) modulator) having an output coupled to drive circuitry of switches that regulate output power. A digital-to-analog converter (DAC) of the switching regulator has a first output coupled to an input of the modulator and a second output configured to indicate when a digital-to-analog conversion of the DAC is complete. A voltage settling detector is configured to receive, from the second output of DAC, an indication that the digital-to-analog conversion is complete and detect a signal transition at the output of the modulator. Based on the indication and the signal transition, the voltage settling detector provides a status indication for the switching regulator (e.g., output voltage ready). By so doing, the voltage settling detector may actively detect and indicate that an output voltage of the switching regulator is at an approximate target output voltage level, instead of waiting a predetermined amount of time, which may be too long or too short in duration based on loading of the switching regulator.

As described herein, the voltage settling detector may monitor a DAC (e.g., voltage stepper) and modulator of a switching regulator to accurately determine when an output voltage of the switching regulator has settled at or proximate a target output voltage. For example, the DAC may provide an indication of when a digital-to-analog conversion to set the target output voltage of the switching regulator is complete. This may include a single or direct conversion from a previous DAC output to a new or updated DAC output that corresponds to the target output voltage level. Alternately, the DAC may indicate when a series of digital-to-analog conversions is complete, which may enable the DAC to gradually step from a previous voltage setting to the target output voltage level.

Once the DAC output has set the output voltage of the switching regulator (e.g., as an input to an error amplifier), the voltage settling detector may monitor the modulator of the switching regulator for a signal transition or other activity. Because modulators are often implemented with precise error amplifiers or feedback comparators, any activity or signal transition at the output of the modulator may be useful to determine when the output voltage of the switching regulator has settled at or proximate the target output voltage level. In most cases, using the DAC and modulator to determine when the output voltage of a switching regulator has settled is much more accurate than implementing a simple time-based delay scheme, which is often merely a guess as to when the switching regulator is ready to operate.

When the voltage settling detector determines that the output voltage of the switching regulator has settled, the voltage settling detector can then notify (e.g., voltage ready signal) a power management entity that the output voltage of the switching regulator has reached the target output voltage. The power management entity may then initiate use of the power provided by the switching regulator. Alternately, the power management entity can a calibration process to compensate a settled output voltage for operational conditions of a system in which the switching regulator is implemented. By promptly notifying the system management entity or otherwise enabling use of the switching regulator, power can be preserved or used more efficiently because idle time of the switching regulator is reduced in comparison with other power sequencing schemes. Further, by using indications provided by the modulator and DAC, the voltage settling detector can detect settling of output voltage in less time and with a higher degree of precision than other methods of detection. In some cases, these aspects enable a switching regulator to be implemented without a voltage settling-specific comparator and associated circuitry, thereby reducing cost and complexity of a switching regulator control IC.

These and other aspects of voltage settling detection for switching regulators are described below in the context of an example environment, example circuits, techniques, and an example integrated circuit. Any reference made with respect to the example environment, circuits, integrated circuit, or elements thereof, is by way of example only and is not intended to limit any of the aspects described herein.

EXAMPLE ENVIRONMENT

FIG. 1 illustrates an example environment 100, which includes a computing device 102 (e.g. a smart-phone). Although not shown, the computing device 102 may be implemented as any suitable computing or electronic device, such as a modem, cellular base station, broadband router, access point, cellular phone, gaming device, navigation device, media device, laptop computer, desktop computer, tablet computer, server, set-top box, network-attached storage (NAS) device, smart appliance, vehicle-based communication system, or other similar devices. Alternately or additionally, components of the computing device 102 may be embodied on a printed circuit board assembly that resides in a chassis, frame, body, or enclosure of the computing device 102.

The computing device 102 includes an integrated circuit 104 (IC 104), which may be configured as any suitable type of circuit or chip, such as an integrated circuit (IC), application-specific IC (ASIC) or system-on-chip (SoC). In this particular example, the IC 104 includes processor cores 106, a graphics processing unit core 108 (GPU core 108), and a computer-readable storage medium 110 (CRM 110). Although shown as a multi-processor-core IC, the IC 104 may alternately be implemented with a single processor core. The IC 104 may include any suitable number of processor cores 106, configured similarly or differently from each other.

For example, the processor cores 106 may be configured as a multi-core processor (e.g., hexa-core or octa-core processor) in which one of the cores has a maximum operating frequency, cache size, power consumption, or instruction set that differs from those of another processor core. Alternately or additionally, the processor cores 106 may have various operating states or power states that range from inactive to fully active, such as powered-down (e.g., mechanical off), deep-sleep, sleep, idle, active, performance, and so on. In each of these states, a voltage or clock frequency of a processor core may be adjusted or altered accordingly to accommodate a corresponding decrease or increase in processor activity. For example, processor core voltage and operational frequency may be increased to provide more processing performance. Alternately, the processor core voltage and operational frequency may be decreased to minimize power consumption or extend device run-time. The processor cores 106 may be grouped or configured as any suitable type of processor, such as an application processor, configured to execute processor-executable code stored by the computer-readable storage medium (CRM) 110.

The GPU core 108 may be configured to process visual-related data or graphical content for presentation or display to a user. In some cases, the GPU core 108 includes dedicated processing pipelines for rendering polygons, vectors, shading, ray traces, texture, and the like. The GPU core 108 may also have various operating states or power states that range from inactive to fully active, such as powered-down, sleep, idle, active, and so on. In each of these states, a voltage or clock frequency of the GPU core 108 may be adjusted accordingly to accommodate a corresponding decrease or increase in GPU core activity. For example, the voltage and clock frequency of the GPU core 108 may be reduced when the GPU core is throttled, idled, or in a sleep state (e.g., low-power state).

The CRM 110 (e.g., memory) of the computing device 102 stores information of the IC 104, such as data of the processor cores 106 and the GPU core 108. Although not shown, the CRM 110 may include a memory controller that manages access to the CRM 110 or other memories of the computing device 102. The CRM 110 may include any suitable type of data storage media, such as volatile memory (e.g., random access memory (RAM)), dynamic RAM (DRAM), static RAM (SRAM), non-volatile memory (read-only memory (ROM)), or Flash memory. In the context of this disclosure, the CRM 110 is implemented to store instructions 112, data 114, or other information of the IC 104, and thus does not include transitory propagating signals or carrier waves.

A modem 116 of the IC 104 provides a digital communication interface for data, voice, messaging, and other applications of the IC 104. The modem 116 may include baseband circuitry to perform high-rate sampling processes, such as analog-to-digital conversion, digital-to-analog conversion, gain correction, skew correction, or frequency translation. The modem 116 may also support multiple types of wireless communication and provide an interface with a radio frequency (RF) transceiver, RF front end, and antennas (not shown) of the computing device 102 to facilitate communication via a wireless network or peer-to-peer connection.

The computing device 102 also includes a power management integrated circuit 118 (PMIC 118) for power regulation and a voltage settling detector 120. The PMIC 118 can regulate external or internal power of the computing device 102 to provide regulated power for the IC 104 or other components and subsystems of the computing device 102. In some cases, the PMIC 118 regulates power received from a battery or external supply of the computing device 102 to provide lower-voltage power rails for the IC 104 and the other components. The voltage settling detector 120 may detect when a voltage of power provided by the PMIC 118 has settled proximate a target or set voltage level. Alternately or additionally, the voltage settling detector 120 can provide an indication of when the voltage of power provided by the PMIC 118 has settled. These and other implementations and/or uses of the PMIC 118 and voltage settling detector 120 may vary, and are described throughout the disclosure.

In various configurations, the computing device 102 may also include input/output ports 122 (I/O ports 122), a display 124, and/or data interfaces 126. The I/O ports 122 enable data exchanges or interaction with other devices, networks, or users. The I/O ports 122 may include serial ports (e.g., universal serial bus (USB) ports), parallel ports, audio ports, infrared (IR) ports, or other like ports. The display 124, when implemented natively, presents graphics of the computing device 102, such as a user interface of elements rendered by the GPU core 108 for an operating system, program, or application of the computing device 102. Alternately or additionally, the display 124 may be implemented as a display port or virtual interface, through which graphical content of the computing device 102 is transmitted by the computing device 102 for presentation at another display.

The data interfaces 126 provide connectivity to respective networks and other electronic devices connected therewith. The data interfaces 126 may include wired data interfaces, wireless data interfaces, or any suitable combination thereof. Example wired data interfaces of the computing device 102 include Ethernet, USB-based, or fiber optic interfaces for communicating information over a local network, intranet, or the Internet. Alternately or additionally, the computing device 102 may have wireless interfaces that enable communication over a wireless network, such as a wireless LAN, peer-to-peer (P2P), cellular network, and/or wireless personal-area-network (WPAN). In such cases, the wireless interfaces may be implemented separately from, or in conjunction with, the modem 116 and other RF circuitry of the IC 104.

Figure 2:
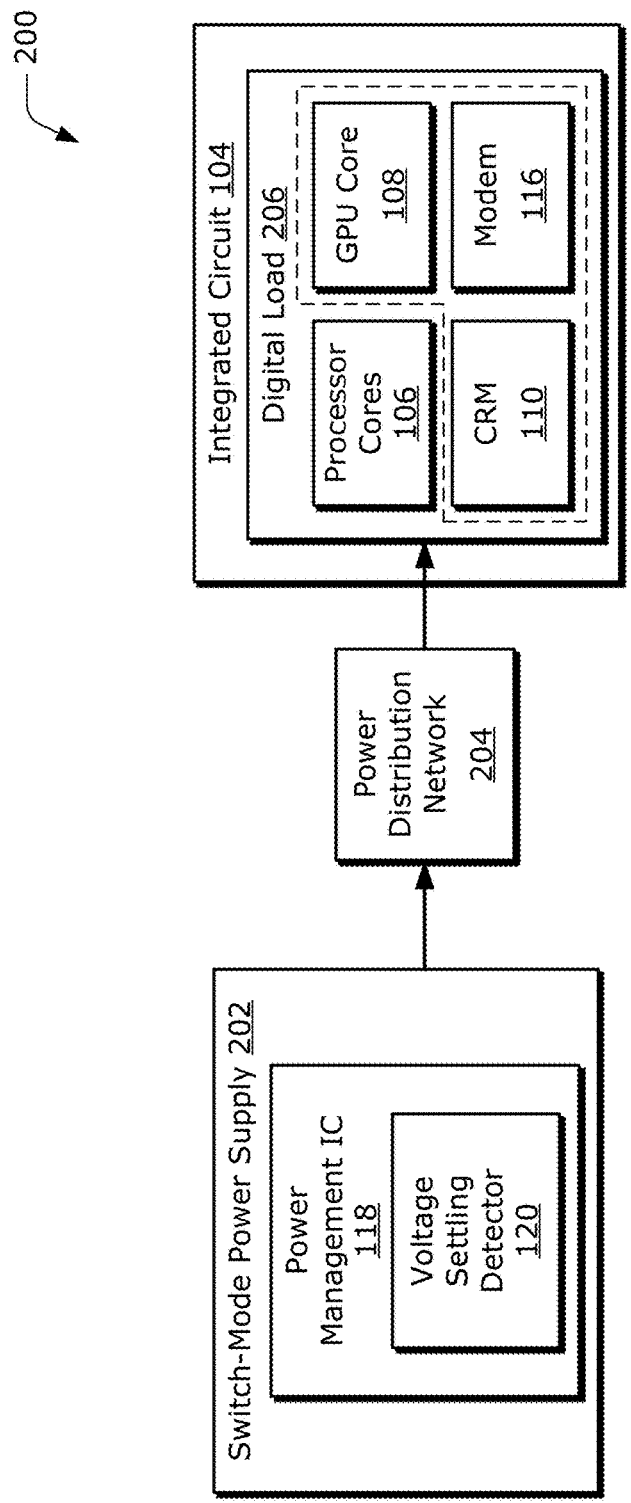
FIG. 2 illustrates an example configuration of the integrated circuit and power regulation components of FIG. 1.

FIG. 2 illustrates an example configuration of an integrated circuit 104 and a PMIC 118 generally at 200. In this example, the PMIC 118 is implemented as a controller of a switch-mode power supply 202 (SMPS 202). The SMPS 202 may be configured as any suitable type of switching regulator, such as a high frequency SMPS (e.g., above 1 MHz) or multi-phase SNIPS. The PMIC 118 may regulate characteristics of power (e.g., voltage or current) provided by the SMPS 202 by controlling or driving switch devices (not shown) of the SMPS 202. The switch devices of the power supply may be integrated with the PMIC 118 or implemented as discrete components coupled to the PMIC 118 on a printed circuit board assembly (PCBA) on which the PMIC 118 is disposed. Alternately or additionally, the SMPS 202 may be implemented as a buck converter that decreases voltage of source power (e.g., input power), a boost converter that increases voltage of the source power, or a combination boost-buck converter capable of both boosting or bucking voltage of the source power.

An output of the SMPS 202 is coupled to a power distribution network 204. The power distribution network 204 distributes regulated power to components or subsystems of the computing device 102, such as the IC 104, I/O ports 122, display 124, or data interfaces 126. The power distribution network 204 may include conductive (e.g., copper) traces or portions of conductive planes of a printed circuit board (PCB) or flexible printed circuit (FPC) for distributing the regulated power. In some cases, the conductors of the power distribution network 204 may include or introduce routing parasitics (e.g., capacitance) that affect an output voltage of the SMPS 202. Alternately or additionally, the power distribution network 204 may include filtering or suppression components, such as filter capacitors or ferrites, to mitigate noise or interference in the power distribution network 204.

In this example, the power distribution network 204 couples the SMPS 202 to a digital load 206 of the integrated circuit 104. The digital load 206 may include any suitable type of component or block of the IC 104, such as a processor core, GPU core, communications processor, digital signal processor (DSP), memory, or media encoder. Although shown as a single coupling (e.g., power rail), each digital load or component of the integrated circuit 104 may operate at a different respective voltage level. As such, the SMPS 202 or other power supplies can provide power to the integrated circuit 104 via multiple different power rails at multiple different voltages. In some cases, the voltage of power provided by the SMPS 202 ranges from approximately 0.5 volts to 3.3 volts. Alternately or additionally, an output voltage level of the SMPS 202 can be dynamically adjusted at any suitable resolution.

With reference to FIG. 2, the digital load 206 includes the processor cores 106 of the integrated circuit 104, which may be implemented as cores of an application processor. In some cases, each of the multiple processor cores 106 includes a separate power rail by which the SMPS 202 or another power supply provides operational power. As such, operational parameters of each processor core 106, such as core voltage or frequency, can be independently monitored or controlled without affecting operation of the other processor cores. As shown in FIG. 2, the digital load 206 of the integrated circuit 104 may also include the GPU core 108, CRM 110, and modem 116. For example, the integrated circuit 104 may be implemented as a system-on-chip (SoC) that includes instances of these components, each of which are configured to receive power regulated by the PMIC 118 via the power distribution network 204.

Figure 3:
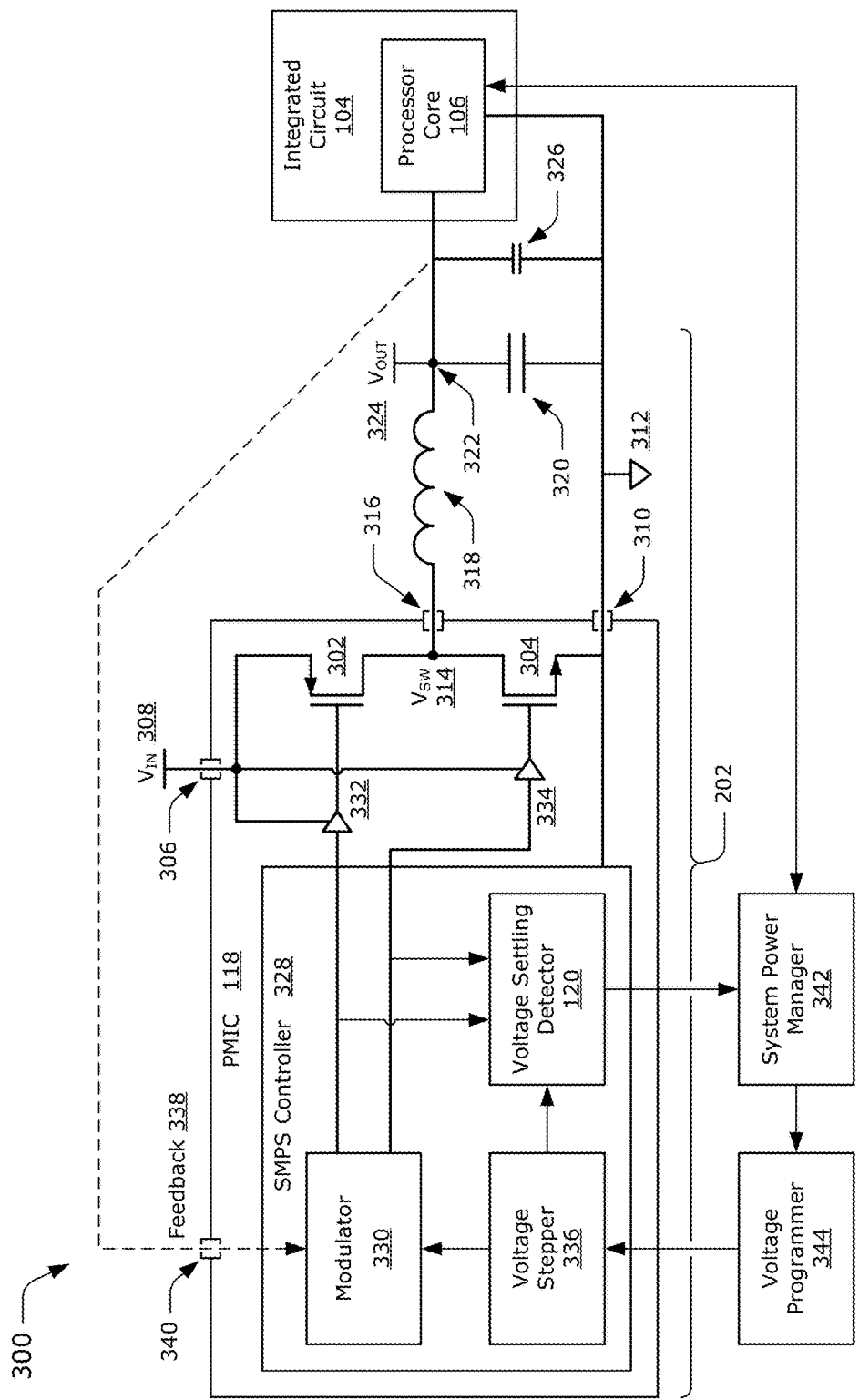
FIG. 3 illustrates an example configuration of a switching-regulator circuit in accordance with one or more aspects.

FIG. 3 illustrates an example configuration of the SMPS 202 and a digital load, in this case the processor core 106, generally at 300. Although described in reference to a single-phase voltage-reducing buck regulator, the aspects and techniques herein may be applied to other types of power supplies or power regulation topologies, multi-phase switching regulators, boost converters, buck-boost converters, linear regulators, battery charging systems, and so on. Further, signal-carrying or current-carrying structures of the circuits may be implemented as any suitable type of conductor, such as wires, printed circuit board (PCB) traces, etched metal layers, planes, contacts, nets, paths, rails, or other like couplings. The use of these terms is not meant to limit a configuration of any circuit, but to provide context for describing the circuits of the accompanying figures.

As shown in FIG. 3, this example of the SMPS 202 includes a PMIC 118 with integrated switch devices 302 and 304 (e.g., a switch stack), which may be configured as a p-channel metal-oxide-semiconductor field-effect transistor (p-channel MOSFET) and an n-channel MOSFET, respectively. The switch device 302 has a source coupled, via a power input node 306, to a power rail with an input voltage 308. The switch device 304 has a source coupled, via a voltage reference node 310 to a lower potential, which is shown as ground 312 in this example. Respective drains of the switch devices 302 and 304 are coupled together at a switch voltage node 314 (Vsw 314), which in this example is coupled to an output node 316 of the PMIC 118. Any suitable external or discrete components may be coupled to the output node 316 of the PMIC (or the Vsw node 314), such as energy storage components or filter components. Generally, the SMPS 202 regulates power by alternately connecting either of the switch device 302 or the switch device 304 to the switch voltage node 314 to source current to a load connected to an output of the SMPS 202 (e.g., output node 316). Depending on current loading, respective on-times of either or both switch devices can be adjusted such that regulator power is provided at a particular voltage at the output of the SMPS 202.

The output node 316 of the PMIC 118 may be connected to energy storing components to filter or smooth the power regulated by the SMPS 202. In this example, the output node 316 is coupled to an inductor 318 and capacitor 320 that are configured as an inductor-capacitor (LC) filter to filter regulated power provided at an output node 322 of the switching regulator 202 (e.g., an SMPS output node) at an output voltage 324. Alternately or additionally, the SMPS 202 or a power distribution network can include a filter capacitor 326 to filter noise from the output of the switching regulator. Although shown as a single filter capacitor 326, any suitable network of bulk and/or filter capacitors may be coupled to the output of the SMPS 202.

The PMIC 118 also includes a switch-mode power supply controller 328 (SMPS controller 328), which is configured to control the switching devices 302 and 304 to regulate the output voltage 324 of power provided by the SMPS 202 at the output node 322. The SMPS controller 328 may implement any suitable control or switching mode to regulate power, such as a pulse-width modulation (PWM) mode, a pulse-frequency modulation (PFM) mode, a pulse-skipping mode, or like operational modes. In this example, the SMPS controller 328 includes a modulator 330 to generate respective control signals for the switching devices 302 and 304. Gate drivers 332 and 334 (e.g., switch drive circuitry) of the PMIC 118 may be coupled between the modulator 330 and respective gates of the switch devices 302 and 304 to ensure that the switch devices 302 and 304 are driven with sufficient current to achieve full turn-on for efficient switching.

The modulator 330 may generate the control signals for the switching devices 302 and 304 based on a reference voltage provided by a voltage stepper 336 of the SMPS controller 328 and a feedback signal 338 received from the output node 322 via a feedback node 340 of the PMIC 118. For example, the modulator 330 may generate control signals for the switching devices 302 and 304 based on a comparison of the feedback signal 338 and a reference voltage generated by the voltage stepper 336. In some cases, the voltage stepper 336 is implemented as a digital-to-analog converter (DAC) circuit to generate or adjust the reference voltage by which the output voltage 324 of the SMPS 202 is controlled.

In this example, the SMPS 202 is associated with a system power manager 342 that can manage power sequencing, voltage adjustment, or respective operation of the SMPS 202 and the processor core 106. In some cases, the system power manager 342 determines operational parameters for the processor core 106 based on a workload of the processor core 106, respective workloads of others processor cores 106, or a power scheme or power profile setting of the computing device 102. For example, the system power manager 342 may determine a frequency and voltage level at which the processor core 106 is to operate and scale an output of a clock generator (not shown) associated with the processor core 106 and the output voltage 324 of the SMPS 202 accordingly. Although shown separate from the IC 104, the system power manager 342 may be embodied on the IC 104 or associated with the processor cores 106, such as part of a power management entity or supervisor for the computing device 102.

The system power manager 342 can configure or set the output voltage 324 of the SMPS 202 to a target output voltage level via a voltage programmer 344. The voltage programmer 344 may include a system power management interface (SPMI) by which the system power manager 342 can access or control the voltage programmer 344 or the voltage stepper 336. In some cases, voltage programmer 344 generates a digital output or bit sequence to control the voltage stepper 336 to adjust or set the reference voltage of the modulator 330, which in turn adjusts the output voltage 324 of the SMPS 202. As implied by name, the voltage stepper 336 may transition from a current reference voltage level to another reference voltage level that corresponds to the target output voltage level through a series of incremental steps or decremental steps. Alternately or additionally, the voltage stepper 336 may transition directly from a current reference voltage level to the reference voltage level that corresponds to the target output voltage level in a single step (or controlled slope).

In some aspects, the output voltage 324 of the SMPS 202 is allowed to settle before power is drawn from the SMPS 202 or a calibration process is initiated. This may be effective to ensure that a component or load operates at a correct voltage or to improve accuracy of the calibration process. A voltage settling detector 120 of the PMIC 118 may be coupled with the modulator 330 and the voltage stepper 336 to determine when the output voltage 324 of the SMPS 202 settles near or proximate a target output voltage level. For example, the voltage settling detector 120 may receive an indication from the voltage stepper 336 that an analog-to-digital conversion to set the reference voltage of the modulator is complete. The voltage settling detector 120 may then monitor or wait until one of the control signals generated at an output of the modulator 330 transitions (e.g., modulator output activity), such as when the modulator 330 starts operating or resumes operation to regulate the output voltage 324 at the output node 322 of the switching regulator 202. A transition of the control signal may indicate that the output voltage 324 is proximate the target output voltage level and that the modulator 330 is activating one of the switch devices 302 or 304 to maintain or keep the output voltage 324 near the target output voltage level. As such, the voltage settling detector 120 may be implemented without a dedicated comparator or receiving feedback directly from the output of the PMIC 118 or the SMPS 202.

In response to determining the output voltage 324 of the switching regulator 202 is near the target output voltage level, the voltage settling detector 120 can provide an indication to the system power manager 342 that the output voltage 324 is settled. For example, the voltage settling detector may transmit an "regulator voltage ready" ($V_{REG\_READY}$) or an acknowledgment (ACK) to the system power manager 342 indicating that the output voltage 324 has settled. The system power manager 342 may then enable or cause the processing core 106 to draw power from the SMPS 202 at the target output voltage. Alternately or additionally, the system power manager 342 can implement a calibration procedure to compensate the output voltage 324 for operating conditions, such as temperature or semiconductor process variations of the processor core, to reduce an amount of voltage overhead (e.g., in a processor core) in order to conserve additional energy.

Figure 4:
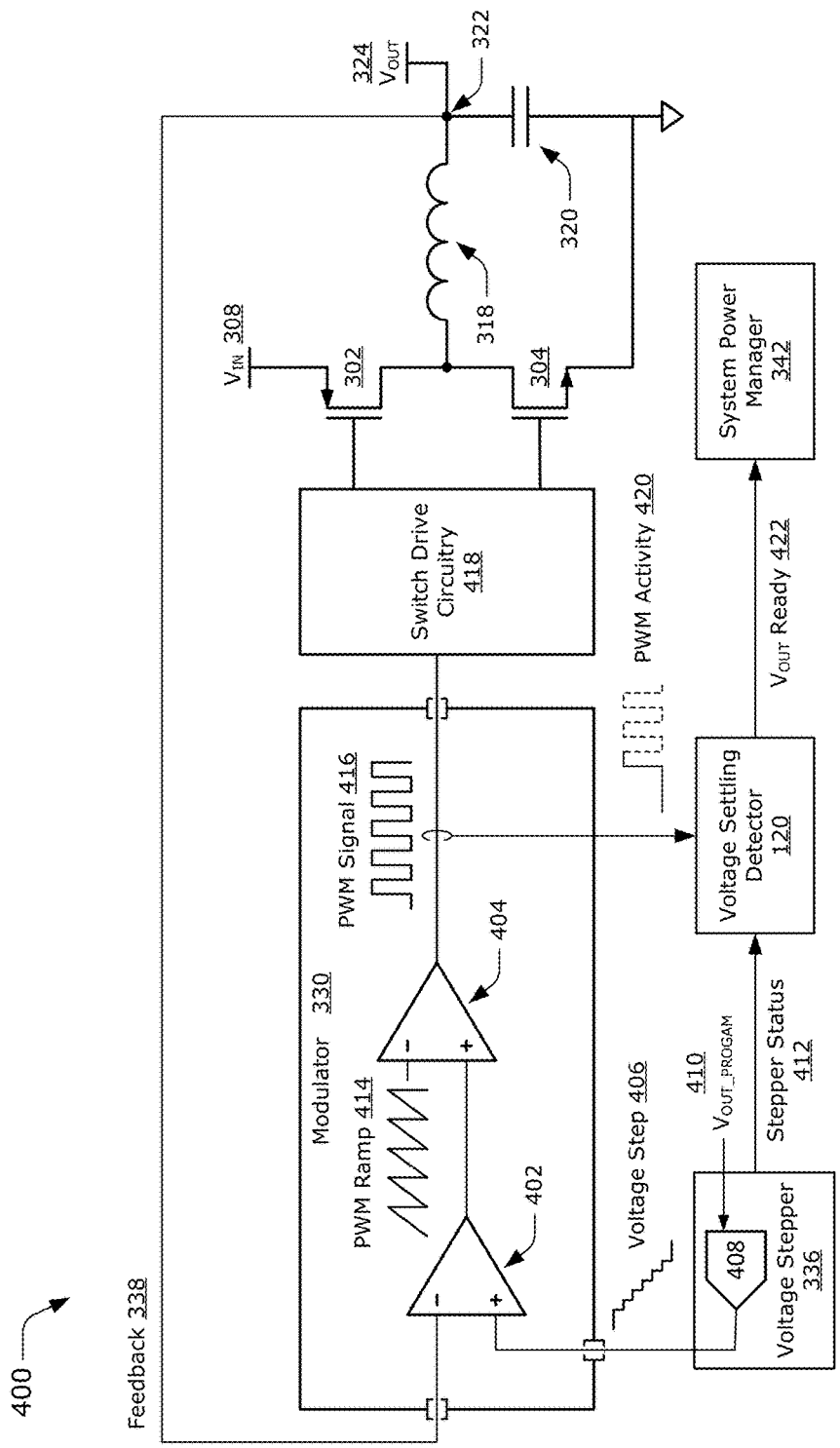
FIG. 4 illustrates an example configuration of components of a switch-mode power supply controller.

FIG. 4 illustrates an example configuration of components of a switch-mode power supply controller generally at 400. For brevity, description of elements previously described with reference to FIG. 3 may be omitted, such as when those elements are implemented in similar configurations or with like uses. The components of the SMPS controller (or PMIC) shown in FIG. 4 may be configured to implement any suitable type of operation or control mode, such as a PWM mode, a PFM mode, a pulse-skipping mode, or other various operational modes. Generally, a modulator 330 and associated circuitry of the SMPS controller manage the switching or on-times of the switch devices 302 and 304 based on a feedback signal 338 of output voltage 324 and a reference voltage, such as an output of a voltage stepper 336, to provide regulated power.

In this example, the modulator 330 includes an error amplifier 402 coupled to inputs of the modulator 330 and a PWM comparator 404 coupled to an output of the modulator 330. The error amplifier 402 may be implemented as any suitable type or configuration of error amplifier, such as a high precision error amplifier and/or with various gain, integration, or compensation features. In some cases, a non-inverting input of the error amplifier 402 is coupled to an output of a voltage stepper 336 to receive a voltage step signal 406 or reference voltage. In this example, the voltage stepper 336 includes a digital-to-analog converter 408 (DAC 408) to generate the voltage step signal 406 based on an output voltage programming signal 410 ($V_{OUT\_PROGRAM}$ 410). An inverting input of the error amplifier 402 may be coupled to an output node 322 of the switching regulator to receive a feedback signal 338 that indicates an output voltage 324. Alternately or additionally, the feedback signal 338 can be received directly from the output or through a voltage divider or compensation network of passive components (e.g., a resistor divider or filter capacitors, not shown). Based on the feedback signal 338 and the voltage step signal 406, the error amplifier 402 can provide an indication of error or difference between the input signals to the PWM comparator 404 to enable regulation of the output voltage 324.

Generally, the voltage stepper 336 generates the voltage step signal 406 as a series of digital-to-analog conversions to increase or decrease the reference voltage level provided to the error amplifier 402 of the modulator 330. For example, based on the output voltage programming signal 410, the DAC 408 can perform a series of digital-to-analog conversions to generate the voltage step signal 406 to alter or adjust the output voltage 324. The voltage stepper 336 may increment or decrement the reference voltage level with any suitable size of increment or decrement, such as voltage steps that range in resolution from a tenth of a volt to a hundredth of a volt. As such, the voltage stepper 336 may generate a voltage step signals 406 that enable precise control of the output voltage 324 of the switching regulator. In some aspects, the voltage stepper 336 provides an indication of stepper status 412 to the voltage settling detector 120. This indication of stepper status 412 may indicate that the voltage stepper 336 is preparing to conduct a voltage stepping operation, that a voltage stepping operation is in process, or that a voltage stepping operation is complete. For example, the voltage stepper 336 may assert or de-assert a stepper status 412 signal line in response to the DAC 408 completing a voltage step operation to indicate "voltage stepping complete" to the voltage settling detector 120.

Based on the output of the error amplifier 402 and a PWM ramp signal 414 provided by a periodic signal generator, the PWM comparator 404 can generate a PWM signal 416 for controlling the switch devices 302 and 304. In this example, the SMPS controller also includes switch drive circuit 418 (e.g., power stage drive) coupled between an output of the PWM comparator 404 and respective gates of the switch devices 302 and 304. The switch drive circuitry may include any suitable circuitry, such as gate drivers (e.g., level shifters or amplifiers) and dead-time control circuitry to generate separate gate drive signals for each of the switch devices 302 and 304. The dead-time control circuitry may also be configured to control respective on-times of the switch devices 302 and 304 to implement soft switching or to prevent shoot-thru, such as when both switch devices 302 and 304 are at least partially active.

With reference to the PWM signal 416, the PWM comparator 404 may vary a duty-cycle of the PWM signal 416 based on the output of the error amplifier 402. For example, when the output voltage 324, and thus feedback signal 338, is below a reference voltage provided by the voltage stepper 336 (e.g., the DAC 408), the error amplifier 402 may generate an signal that corresponds to the difference between the output voltage 324 and the reference voltage (e.g. voltage step signal 406). Based on this signal, the PWM modulator may increase a duty-cycle of the PWM signal 416 to increase on-times of the switch device 302 (e.g., high-side FET switch) to increase the output voltage 324 until the output voltage 324 exceeds the reference voltage at the input of the error amplifier 402. Alternately, the duty-cycle of the PWM signal 416 may be decreased when the output voltage 324 exceeds the reference voltage at the input of the error amplifier 402. This process may generally describe a PWM operation mode of a switching regulator in which the duty-cycle of the PWM signal 416 is continuously or intermittently adjusted based on a comparison of the output voltage 324 and a reference voltage provided to the error amplifier 402.

In aspects of voltage settling detection, the voltage settling detector 120 may use a change in a switching regulator's mode of operation to determine that an output voltage of the switching regulator is near or proximate a target output voltage. For example, when the voltage stepper 336 increases or decreases a reference voltage of the error amplifier 402 to alter a target output voltage of switching regulator, a mode or activity state of the modulator (e.g., PWM signal 416) may also change. When the target output voltage of the switching regulator is decreased, a duty-cycle of the PWM signal 416 may decrease or fall to zero until the output voltage 324 of the switching regulator reaches or settles to the decreased target output voltage level. Because the error amplifier 402 may be implemented as a high precision error amplifier, the modulator 330 (or PWM comparator 404) may increase the duty-cycle or, or re-start the PWM signal 416, as soon as the output voltage 324 approaches the target output voltage level.

In the context of FIG. 4 and a decreased target voltage level, the voltage settling detector 120 may detect PWM activity 420 (or modulator activity) as a first transition of a re-started PWM signal 416. In this case, the re-started PWM signal 416 indicates that the output voltage 324 of the switching regulator has settled near or proximate the decreased target voltage and the modulator 330 is activating to resume regulation of power at the adjusted target voltage level. The voltage settling detector, having received an indication of stepper status 412 and detecting PWM activity 420, can then generate or provide an output voltage ready signal 422 ($V_{OUT}$ Ready 422) to the system power manager 342.

The system power manager 342 may then initiate operation of a processor core 106 at the adjusted target output voltage level or start a calibration process to further compensate operation of the switching regulator and/or the processor core. By using indications provided by the modulator 330 and voltage stepper 336, the voltage settling detector 120 can detect settling of regulator output voltage in less time and with a higher degree of precision than other methods of detection. In some cases, the aspects described herein enable a switching regulator to be implemented without a voltage settling-specific comparator and associated circuitry, thereby reducing cost and complexity of a switching regulator control IC.

Techniques of Voltage Settling Detection for Switching Regulators

The following techniques of voltage settling detection for switching regulators may be implemented using any of the previously described elements of the example environment, circuits, or components. Reference to elements, such as the voltage settling detector 120, modulator 330, or voltage stepper 336, is made by example only and is not intended to limit the ways in which the techniques can be implemented. The techniques are described with reference to example methods illustrated in FIGS. 5, 7, and 9, which are depicted as respective sets of operations or acts that may be performed by entities described herein. The operations described herein may be performed using any suitable circuitry or component, which may provide means for implementing one or more of the operations. The depicted sets of operations illustrate a few of the many ways in which the techniques may be implemented. As such, operations of a method may be repeated, combined, separated, omitted, performed in alternate orders, performed concurrently, or used in conjunction with operations of another method.

Figure 5:
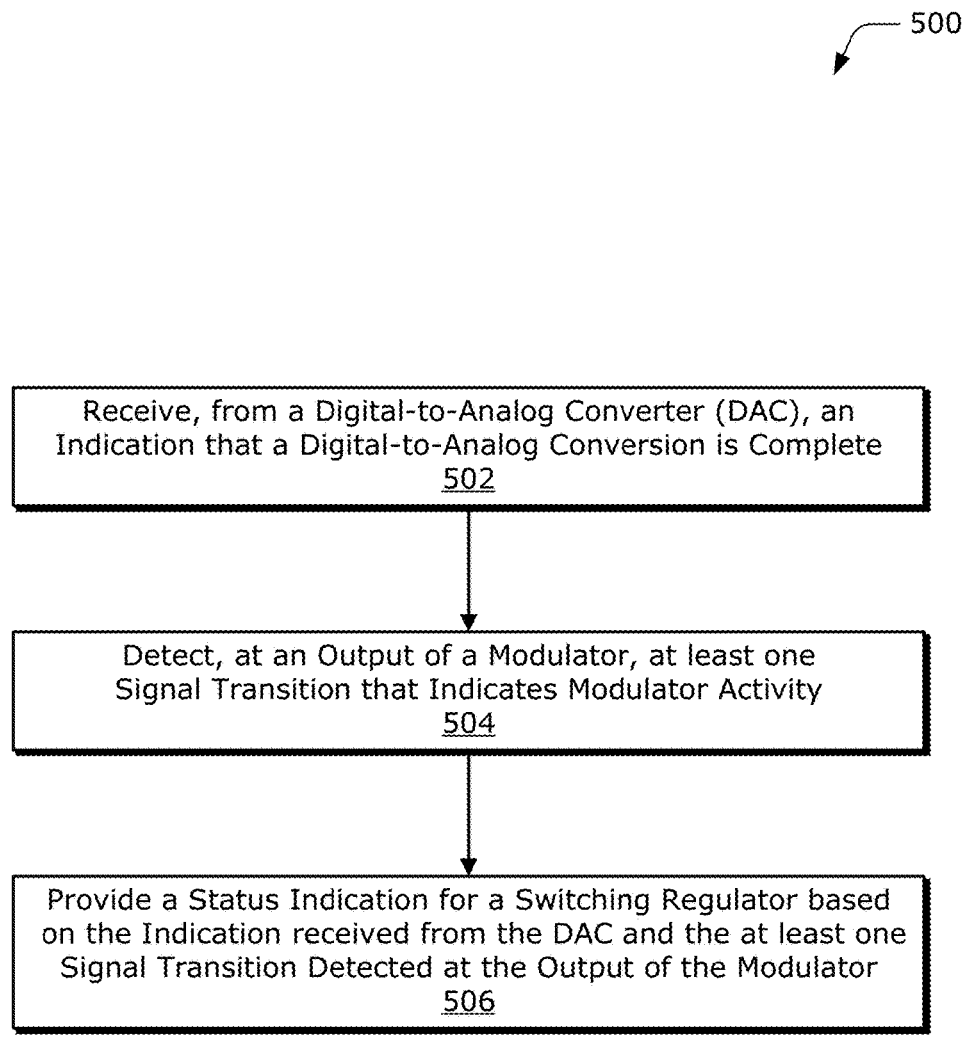
FIG. 5 illustrates an example method for providing a status indication for a switching regulator based on an output of a modulator.

FIG. 5 illustrates an example method 500 for providing a status indication for a switching regulator based on an output of a modulator, including operations performed by the voltage settling detector 120.

At 502, an indication is received from a digital-to-analog converter (DAC) that indicates a digital-to-analog conversion is complete. In some cases, the voltage settling detector 120 receives a stepper status signal 412 (e.g., "voltage step complete") from the voltage stepper. The indication may indicate that a reference voltage of an error amplifier or comparator has been adjusted to a voltage that corresponds with an altered target output voltage level for a switching regulator. Alternately or additionally, an output of the DAC or voltage stepper may be monitored to determine when the analog-to-digital conversion or voltage stepping is complete.

Figure 6:
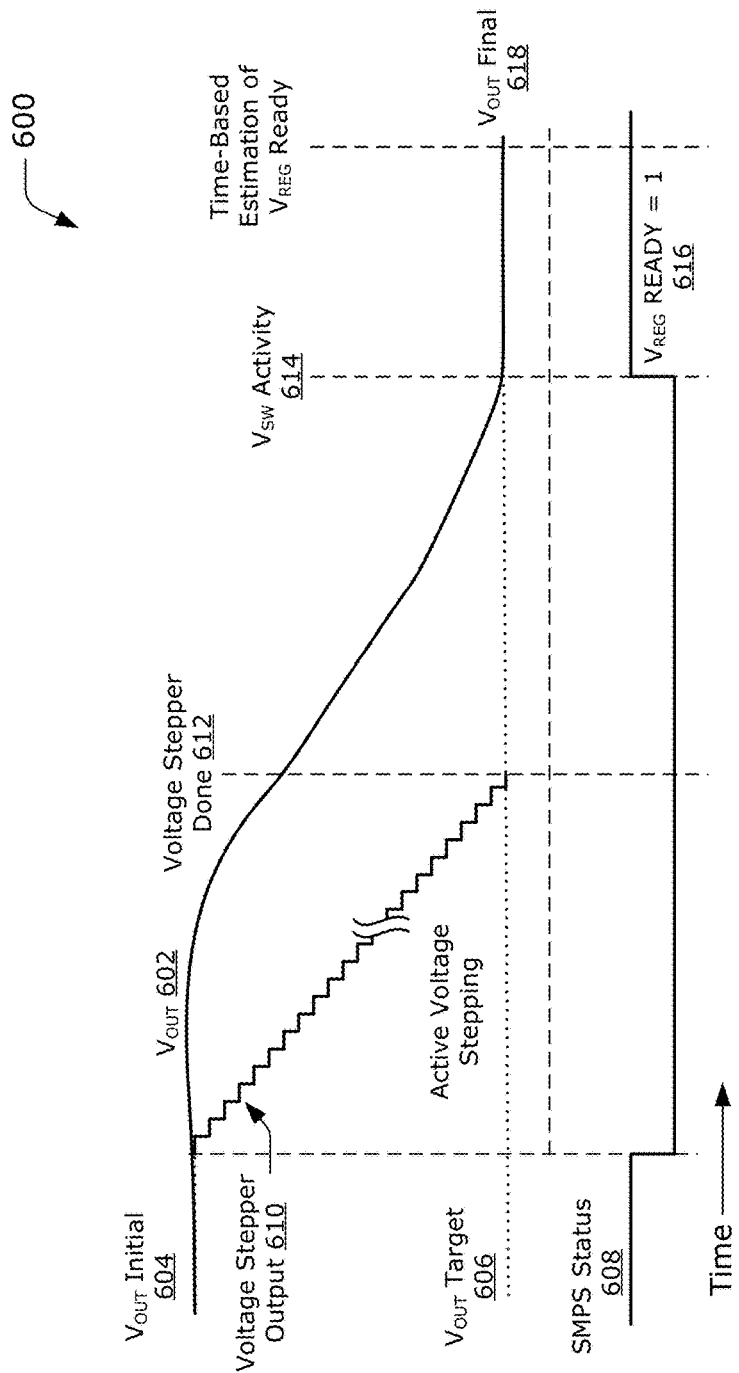
FIG. 6 illustrates an example graph of output voltage of a switching regulator and an associated voltage status signal.

By way of example, consider FIG. 6 in which a voltage stepping to decrease switching regulator output voltage is shown at 600. Here, assume that the system power manager 342 is adjusting an output voltage of the SMPS 202 from 900 millivolts to 750 millivolts to support operation of the processor core 106 of an application processor. In the context of FIG. 6, the voltage stepper adjusts an output voltage 602 ($V_{OUT}$ 602) of a switching regulator from an initial output voltage 604 ($V_{OUT}$ initial 604) of 900 millivolts to a target output voltage 606 ($V_{OUT}$ target 606) of 750 millivolts. To do so, the system power manager 342 initiates an adjustment of the output voltage 602 by suspending operation of the processor core 106 and de-asserts an SMPS status signal 608 to indicate the pending adjustment of voltage.

The system power manager 342 then uses the voltage programmer 344 to program the voltage stepper 336 with the target output voltage level 606 of 750 millivolts. In response to programming, the voltage stepper 336 steps an output signal 610 of the voltage stepper 336 from a reference voltage level that corresponds to 900 millivolts to a revised reference voltage level that corresponds to the target output voltage 606 of 750 millivolts. On completion of the voltage stepping, the voltage stepper 336 provides an indication, "voltage stepper done" 612, to the voltage settling detector 120. Here, note that without the loading of the processor core 106, the output voltage 602 of the SMPS 202 is not actively pulled down to the target output voltage 606. As such, the output voltage 602 may take an unknown duration of time to float or decay down to the target output voltage level 606.

At 504, at least one signal transition is detected at an output of a modulator of the switching regulator. In some cases, the voltage settling detector 120 detects a transition of the PWM signal 416 at the output of the modulator 330. The signal transition may be a first signal transition of a periodic signal that is being generated or resumed to control switch devices for power regulation at a target output voltage level. In other cases, the signal transition may be a signal transition associated with a modulator or SMPS control circuit changing modes of operation for power regulation. For example, after up-stepping an output voltage level of a switching regulator, the signal transition can indicate initiation or a resumption of a pulse-frequency modulation mode.

Returning to the ongoing example, as the output voltage 602 settles near or at the target output voltage level 606, the error amplifier 402 causes the modulator 330 to resume generation of the PWM signal 416 to control the switch devices 302 and 304. The voltage settling detector 120 detects a first (or subsequent) transition of the PWM signal 416 as switch voltage node activity 614 ($V_{SW}$ activity 614) resumes, which indicates that the output voltage 602 has settled proximate the target output voltage level 606.

At 506, a status indication for the switching regulator is provided based on the indication received from the DAC and the at least one signal transition detected at the output of the modulator. In some cases, the voltage settling detector 120 provides, to the system power manager 342, an indication that the output voltage of the SMPS 202 has settled at the target output voltage level (e.g., $V_{OUT}$ Ready). The indication may be provided as a signal or bit configured to indicate that the switching regulator is ready to operate or that an output voltage of the switching regulator is ready. Alternately or additionally, the voltage settling detector may trigger or issue an interrupt to reflect the states of the switching regulator.

Concluding the present example, the voltage settling detector 120 asserts a regulator voltage ready signal 616 (e.g., $V_{REG}$ Ready=1) to the system power manager 342 to indicate settling of the regulator's output at a final output voltage 618 ($V_{OUT}$ Final 618). In response to the voltage ready signal, the system power manager 342 can initiate a calibration process or resume operation of the processor core 106 at the target output voltage 606 of 750 millivolts. Here, contrast timing of the regulator voltage ready signal 616 and a time-based estimate for readiness of regulator voltage. As shown in FIG. 6, aspects of voltage settling detection are not reliant on making a time-based estimation, and are therefore more accurate in determining when the switching regulator is ready for use. By so doing, power of a computing device can be preserved by reducing idle times associated with switching regulator adjustment or startup.

Figure 7:
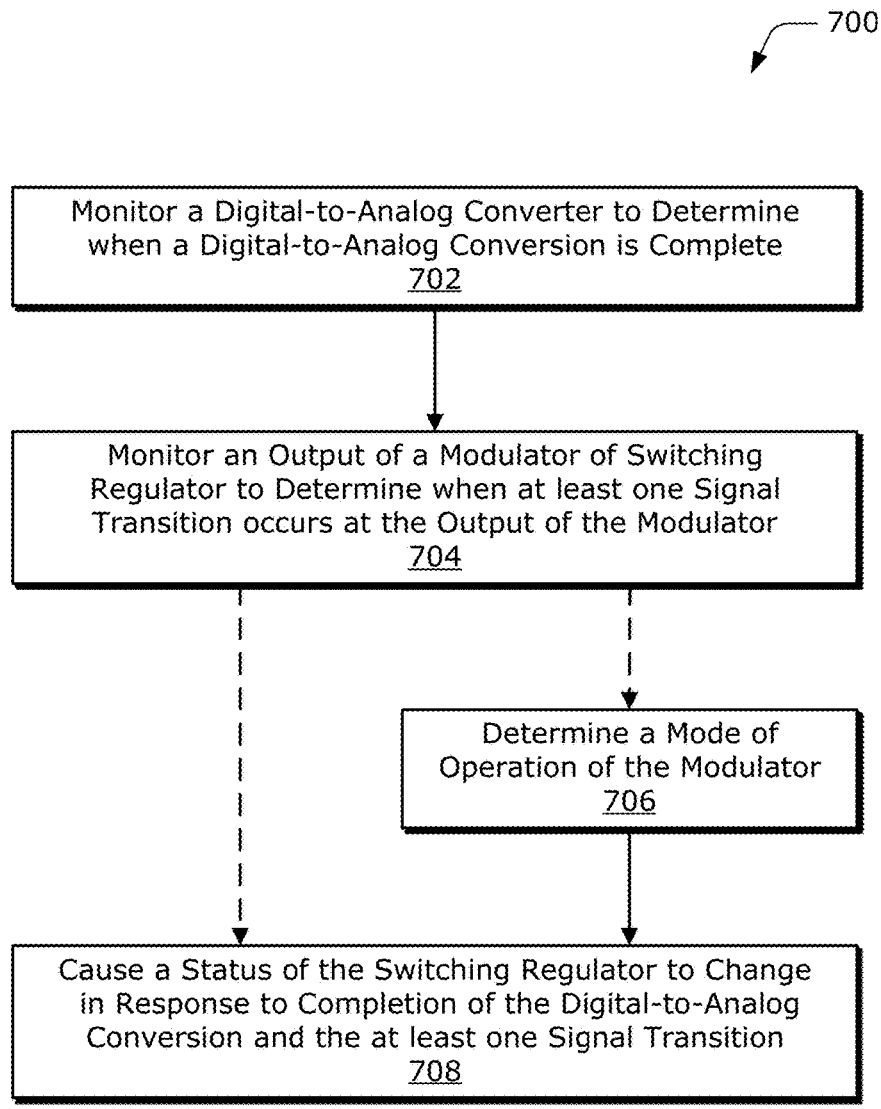
FIG. 7 illustrates an example method for monitoring a digital-to-analog converter and modulator to determine voltage settling for a switching regulator.

FIG. 7 illustrates an example method 700 for monitoring a DAC and modulator to determine voltage settling for a switching regulator, including operations performed by the voltage settling detector 120.

At 702, a digital-to-analog converter is monitored to determine when a digital-to-analog conversion is complete. In some cases, the voltage settling detector 120 monitors an output of the voltage stepper 336 to determine when a voltage stepping operation is complete (e.g., voltage steps cease). In other cases, the voltage stepping regulator monitor another output of the voltage stepper 336 to for a status indication of the voltage stepper 336 (e.g., "voltage stepper done").

At 704, an output of a modulator is monitored to determine when at least one signal transition occurs at the output of the modulator. In some cases, the voltage settling detector 120 monitors an output of the modulator 330 for transitions of a signal provided at the output. In other cases, the voltage settling detector may monitor an output of a PWM comparator, switch drive circuitry, dead-time control circuitry, or similar circuits coupled between an error amplifier and switch devices of a switching regulator. The transition at the output of the modulator, or another signal in the switch drive chain, may indicate initiation or resumption of switch driving activity associated with regulating voltage at the output of the switching regulator.

Figure 8:
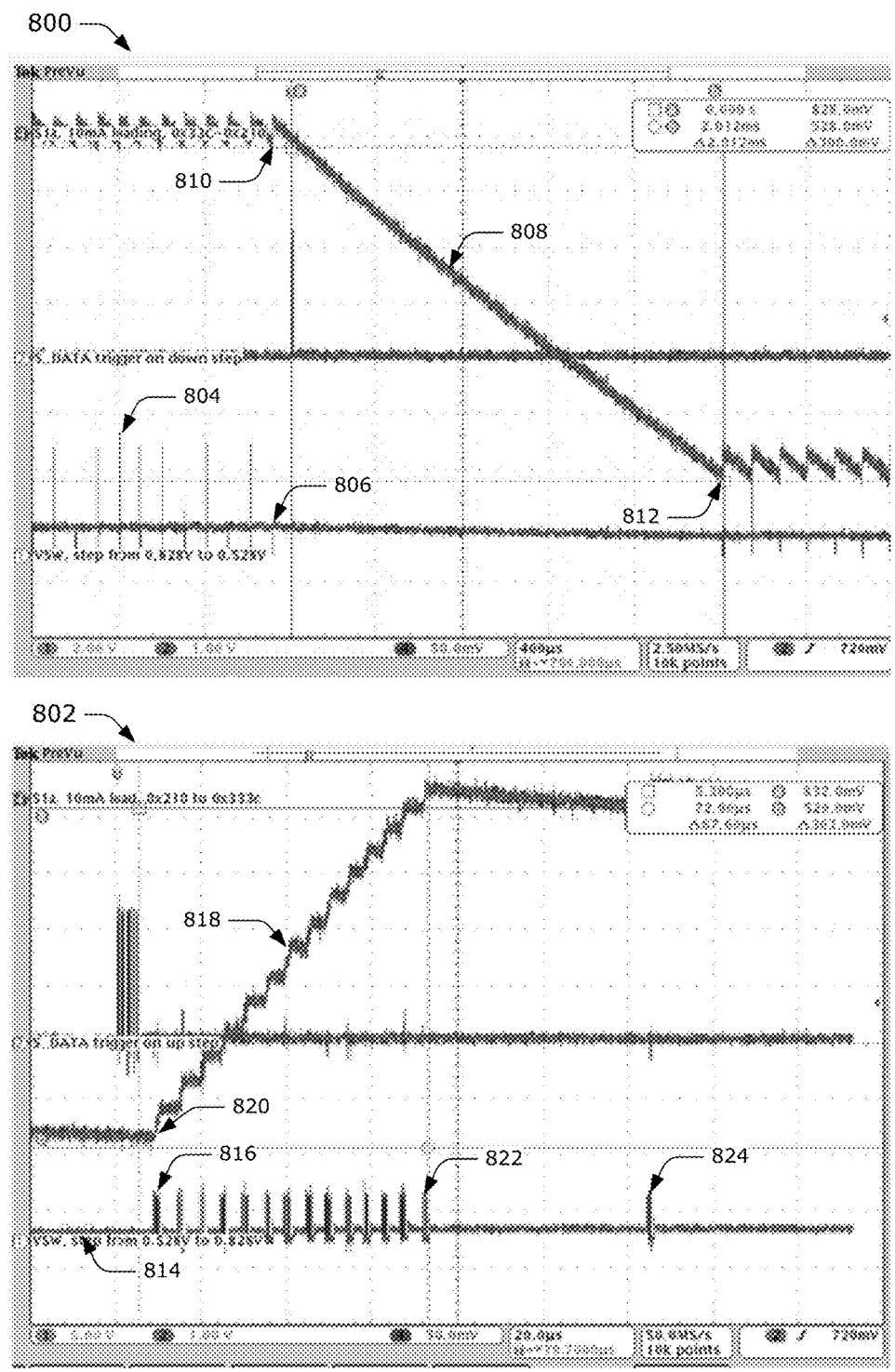
FIG. 8 illustrates an example graphs of voltage settling for stepping down voltage and stepping up voltage of a switching regulator, respectively.

By way of example, consider FIG. 8, which depicts graphs of respective output voltage and switch drive signals for voltage down-stepping at 800 and voltage up-stepping at 802. With reference to voltage down-stepping graph 800, activity of switch drive signal 804 may cease at 806 when the step-down of output voltage 808 is initiated at 810. When the output voltage 808 settles near a stepped-down target voltage, the activity of the switch drive signal 804 resumes at 812. In this context, the voltage settling detector 120 may detect the transition of the switch drive signal at 812 to determine that the output voltage 808 has settled at the stepped-down target output voltage.

Optionally at 706, a mode of operation of the modulator is determined. In some cases, the voltage settling detector 120 determines, based on a signal at the output of the modulator 330, that the modulator has changes modes of operation or has started a particular mode of operation. For example, during a voltage step-up process, the voltage settling detector 120 may determine that the modulator has started or returned to a PFM mode of operation. Alternately or additionally, the voltage settling detector may determine that a duty-cycle of the modulator has changed or been reduced significantly.

With reference to voltage up-stepping graph 802 of FIG. 8, activity of switch drive signal 814 may change at 816 when the step-up of output voltage 818 is initiated at 820. For example, a modulator 330 may transition from a PFM mode to a PWM mode to increase the output voltage 818 to a stepped-up target voltage. When the output voltage 818 settles near the stepped-up target voltage, the activity of the switch drive signal 814 changes again at 822. In this case, the modulator 330 may transition from a PWM mode used to increase the output voltage 818 to a PFM mode to maintain the newly achieved target output voltage level, as indicated by second PFM activity at 824. In the context of the method 700, the voltage settling detector 120 may detect the change in mode of operation for the modulator 330 to determine that the output voltage 818 has settled at the stepped-up target output voltage.

At 708, a status of the switching regulator is caused to change in response to completion of the analog-to-digital conversion and the at least one signal transition. In some cases, the voltage settling detector 120 causes a voltage ready signal (e.g., $V_{REG}$ Ready) or bit of the SMPS 202 to change states (e.g., $V_{REG}$ Ready=1). Changing the status of the switching regulator may be effective to indicate to a power management entity that the switching regulator is ready to provide voltage at a requested or specified output voltage target level.

Figure 9:
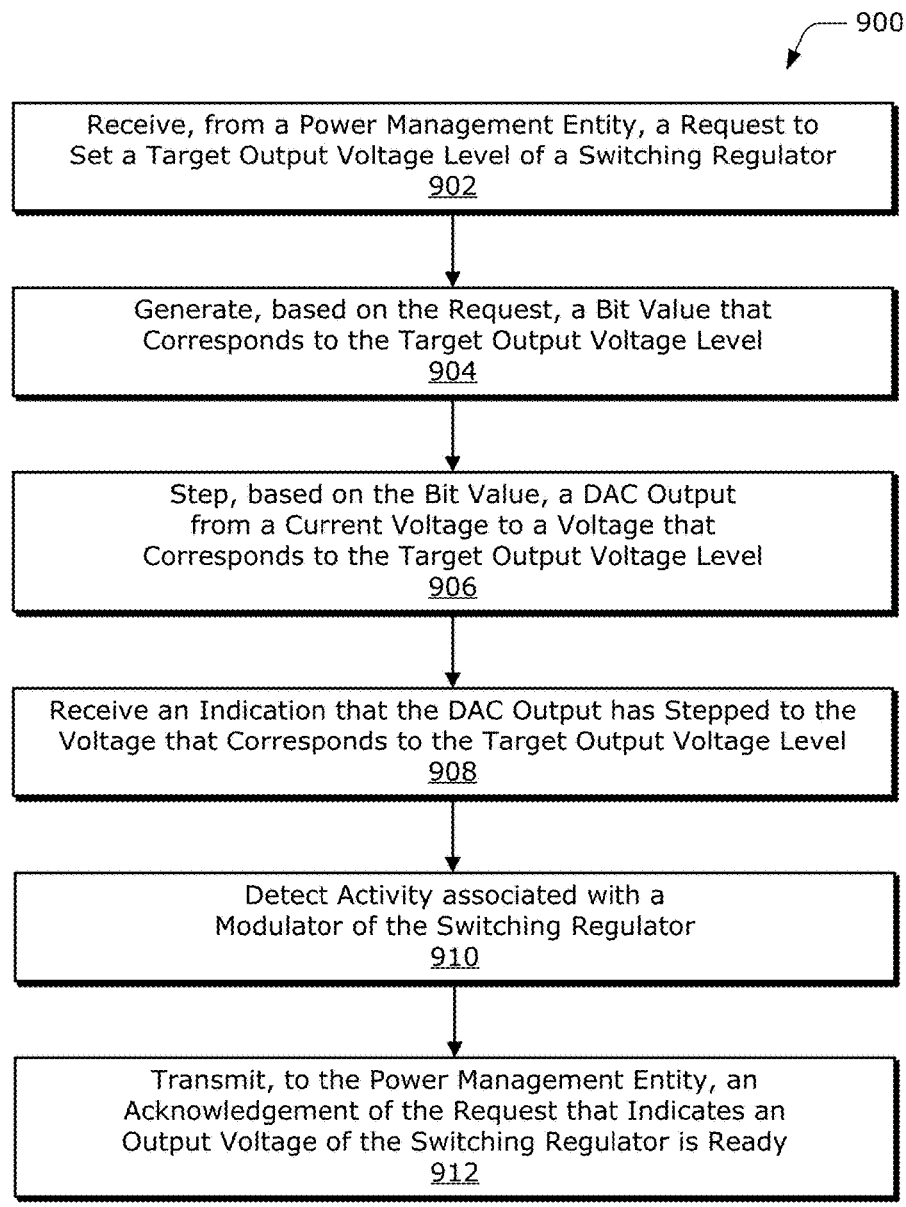
FIG. 9 illustrates an example method for configuring output voltage of a switching regulator in accordance with one or more aspects.

FIG. 9 illustrates an example method 900 for configuring output voltage of a switching regulator, including operations performed by the voltage settling detector 120 and system power manager 342.

At 902, a request to set a target output voltage level of a switching regulator is received from a power management entity. In some cases, the system power manager 342 sends a request via an SPMI interface to the voltage stepper 336 or the voltage programmer 344 to increase or decrease an output voltage 324 of the SMPS 202. The target output voltage level may be indicated by the request as an absolute value or a relative value, such as an offset from a current output voltage of the switching regulator.

At 904, a bit value that corresponds to the target output voltage level is generated based on the request. For example, the voltage programmer 344 can generate a bit value or bit sequence based on the request. The bit value or bit sequence may then be sent to the voltage stepper 336 for conversion to an analog reference voltage. Alternately or additionally, a series of bit values are generated to enable a series of digital-to-analog conversions, such as to enable increasing or decreasing voltage stepping.

At 906, a DAC output is stepped, based on the bit value, from a current voltage to a voltage that corresponds to the target output voltage level. In some cases, the voltage stepper 336 generates an analog voltage level based on a bit value or bit sequence received from the voltage programmer 344. The analog voltage level may be approximately equal to the target output voltage level requested by the system power manager 342. In other cases, the analog voltage level may correspond to the target output voltage level requested by the system power manager 342.

At 908, an indication is received that indicates the DAC output has stepped to the voltage that corresponds to the target output voltage level. For example, the voltage settling detector 120 may receive an indication from the voltage stepper 336 has completed a digital-to-analog conversion or step process to generate the analog reference voltage. Alternately or additionally, the voltage settling detector may monitor an output of the DAC to determine when the voltage stepping is complete.

At 910, activity associated with a modulator of the switching regulator is detected. In some cases, the voltage settling detector 120 detects a signal transition at the output of the modulator 330. In other cases, the voltage settling detector may determine that the modulator 330 has changed modes of operation, such as from a PWM mode to a PFM mode. Alternately or additionally, the modulator 330 may be configured to send an indication to the voltage settling detector 120 when initiating signal generation or transitioning modes.

At 912, an acknowledgement is transmitted to the power management entity that indicates the output voltage of the switching regulator is proximate the target output voltage level. For example, the voltage settling detector 120 may transmit an acknowledgement to the system power manager 342 indicating that the SMPS 202 is ready for operation. The system power manager 342 may then allocate the power provided by the SMPS 202 for use or perform additional verification or calibration operations.

Power Management Integrated Circuit

Figure 10:
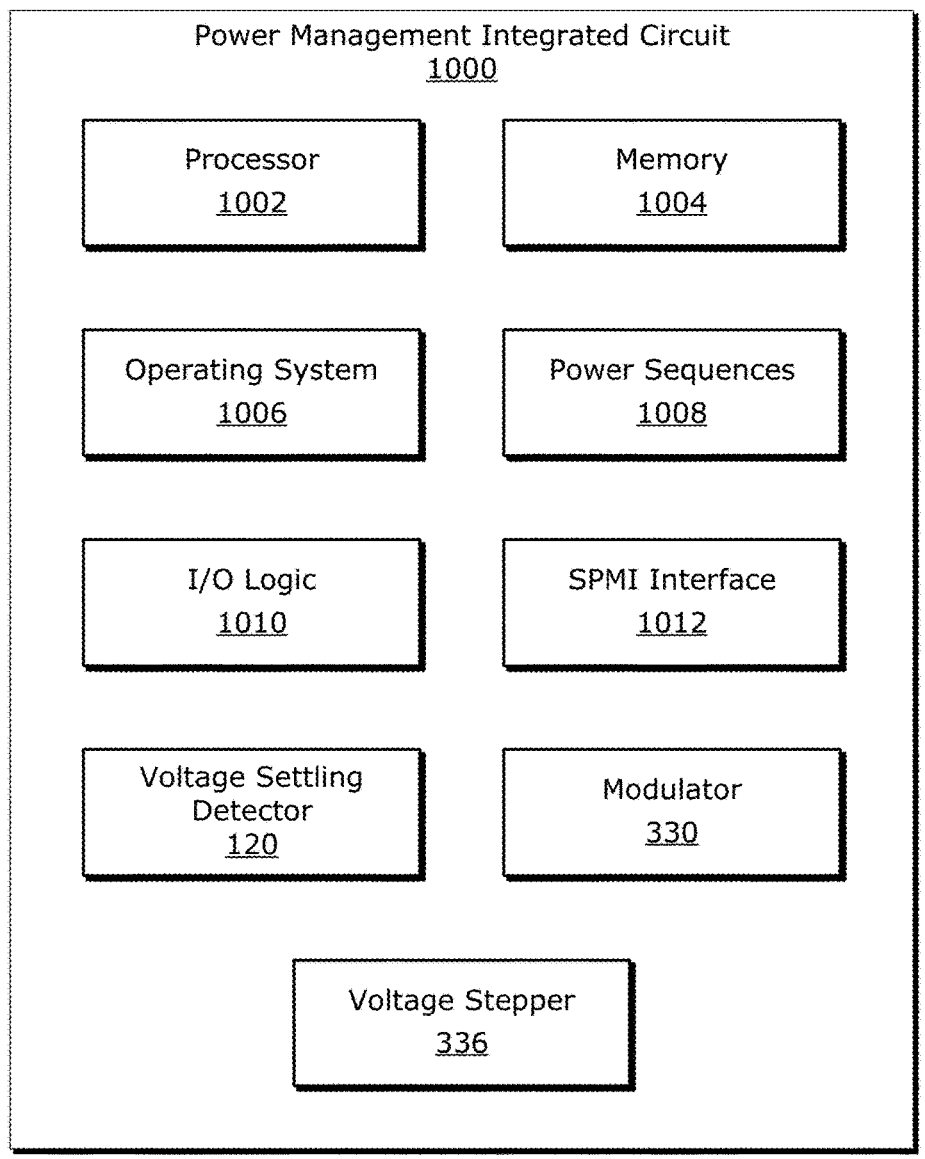
FIG. 10 illustrates an example integrated circuit capable of implementing aspects of voltage settling detection.

FIG. 10 illustrates an example power management integrated circuit 1000 (PMIC 1000), which includes components capable of implementing aspects of voltage settling detection for switching regulators. Entities of the PMIC 1000 may be implemented in combination or separately in any suitable circuitry or package, such as a system-on-chip (SoC), application specific integrated-circuit (ASIC), switch-mode power supply (SMPS) controller, embedded controller, power regulation module, or other like ICs. For example, the PMIC 1000 can be implemented as an SMPS controller with embedded switch devices for a switching regulator or a multi-phase switching regulator. The PMIC 1000 may also be implemented as, or part of, other power regulation circuitry, such as battery charging circuitry, a low-dropout regulator, a light-emitting diode (LED) driver, inductive power transfer circuitry, an audio amplifier, or other circuits that implement DC-DC power regulation or conversion.

In this particular example, the PMIC 1000 includes a processor 1002 (e.g., microprocessor) and memory 1004. The memory 1004 may include any suitable type of memory, such as volatile memory (e.g., DRAM), non-volatile memory (e.g., Flash), or other like memories. The memory 1004 is implemented as a storage medium, and thus does not include transitory propagating signals or carrier waves. The memory 1004 can store data and processor-executable instructions of the PMIC 1000, such as an operating system 1006 of the system and power sequences 1008. The power sequences 1008 may include programmable start-up power sequences or power profiles for respective output voltages and timings (e.g., start-up or adjustment) of switching regulators controlled by the PMIC 1000. Generally, the processor 1002 executes the operating system 1006 and power sequences 1008 from the memory 1004 to implement various functions of the PMIC 1000, such as to manage power regulation in a system in which the PMIC 1000 is embodied.

The PMIC 1000 may also include I/O logic 1010 and a system power management interface 1012 (SPMI 1012). The I/O logic 1010 can be configured to provide a variety of I/O ports, such as general purpose I/Os (GPIOs), gate drive circuitry to drive switch devices of a regulator (not shown), or analog-to-digital circuitry to sample voltage or signals (e.g., voltage feedback signals) at I/O nodes of the PMIC 1000. The SPMI interface 1012 may enable communication with other power-related entities of a system over an SPMI-compliant data bus or similar inter-IC data channel. For example, the PMIC 1000 may communicate, via the SPMI 1012, with a power management entity (e.g., the system power manager 342) to coordinate start-up or voltage adjustments of power regulation circuitry.

The PMIC 1000 also includes the voltage settling detector 120, the modulator 330, and the voltage stepper 336, which may be implemented similarly to or differently from the entities described with reference to FIGS. 1-4. The voltage settling detector 120 can be embodied separately or combined with other components of the PMIC 1000. For example, the voltage settling detector 120 may be integrated with the voltage stepper 336 or other digital logic sections of the PMIC 1000. The voltage settling detector 120, either independently or in combination with other components, can be implemented as processor-executable instructions stored in the memory 1004 and executed by the processor 1002 to implement aspects of voltage settling detection or operations described herein. Alternately or additionally, the voltage settling detector 120 and other components of PMIC 1000 may be implemented as hardware, fixed-logic circuitry, firmware, or a combination thereof that is implemented in association with I/O logic 1010 or other signal processing circuitry of the PMIC.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An integrated circuit for controlling a switching regulator comprising:
    switch drive circuitry having an output coupled to a switch drive output node of the integrated circuit;
    a modulator having a first input coupled to a feedback node of the integrated circuit and an output coupled to an input of the switch drive circuitry;
    a digital-to-analog converter (DAC) having a first output coupled to a second input of the modulator and a second output configured to indicate when a digital-to-analog conversion is complete; and
    a voltage settling detector configured to:
        receive, from the second output of the DAC, an indication that the digital-to-analog conversion is complete;
        detect, at the output of the modulator, at least one signal transition; and
        provide a status indication for the switching regulator based on the indication received from the DAC and the at least one signal transition at the output of the modulator.

2. The integrated circuit as recited in claim 1, wherein:
    the digital-to-analog conversion alters a voltage at the first output of the DAC to configure an output voltage level of the switching regulator; and
    the status indication indicates that an output voltage of the switching regulator is proximate the output voltage level.

3. The integrated circuit as recited in claim 1, wherein the modulator comprises:
    an error amplifier having a first input coupled to the feedback node of the integrated circuit and a second input coupled to the first output of the DAC; and
    a pulse-width modulation (PWM) comparator having a first input coupled to an output of the error amplifier, a second input coupled to a periodic signal generator, and an output coupled to the input of the switch drive circuitry.

4. The integrated circuit as recited in claim 1, wherein the voltage settling detector is coupled to a data interface and configured to provide the status indication via the data interface.

5. The integrated circuit as recited in claim 4, wherein the data interface is configured as a system power management interface (SPMI) compliant bus.

6. The integrated circuit as recited in claim 1, further comprising a switch device having a gate coupled to the output of the switch drive circuitry.

7. The integrated circuit as recited in claim 6, wherein:
    the switch device is a first switch device;
    the output of the switch drive circuitry is a first output;
    the switch drive circuitry further comprises a second output; and
    the integrated circuit further comprises a second switch having a gate coupled to the second output of the switch drive circuitry.

8. The integrated circuit as recited in claim 1, wherein the switch drive circuitry comprises gate drivers or dead-time control circuitry.

9. The integrated circuit as recited in claim 1, wherein the DAC includes an input configured to receive digital information that represents an output voltage level of the switching regulator.

10. The integrated circuit as recited in claim 1, wherein the integrated circuit is embodied as part of a switch-mode power supply, a buck regulator, a boost regulator, or a buck-boost regulator.

11. The integrated circuit as recited in claim 1, wherein the integrated circuit is embodied as part of a single-phase switch-mode power supply or a multi-phase switch mode power supply.

12. An integrated circuit for regulating power comprising:
    a first switch coupled between a power rail of the integrated circuit and a switch output node of the integrated circuit;
    a second switch coupled between a low potential rail of the integrated circuit and the switch output node of the integrated circuit;
    switch drive circuitry having a first output coupled to a gate of the first switch and a second output coupled to a gate of the second switch;
    a modulator having a first input coupled to a feedback node of the integrated circuit and an output coupled to an input of the switch drive circuitry;
    a digital-to-analog converter (DAC) having an output coupled to a second input of the modulator and an input coupled to a digital interface; and
    a voltage settling detector configured to:
        monitor the DAC to determine when a digital-to-analog conversion is complete;
        monitor the output of the modulator to determine when at least one signal transition occurs at the output of the modulator; and
        indicate a status of the integrated circuit in response to completion of the digital-to-analog conversion and the at least one signal transition at the output of the modulator.

13. The integrated circuit as recited in claim 12, wherein:
    the digital-to-analog converter is configured to set or alter a target output voltage level of the integrated circuit; and
    the voltage settling detector is further configured to indicate, via the status of the integrated circuit, that an output voltage of the integrated circuit is proximate the target output voltage level.

14. The integrated circuit as recited in claim 12, wherein the voltage settling detector is further configured to indicate the status of the integrated circuit by changing the status of the integrated circuit from an inactive state to an active state.

15. The integrated circuit as recited in claim 12, wherein the modulator comprises:
   an error amplifier having a first input coupled to the feedback node of the integrated circuit and a second input coupled to the output of the DAC; and
   a pulse-width modulation (PWM) comparator having a first input coupled to the output of the error amplifier, a second input coupled to a periodic signal generator, and an output coupled to the input of the switch drive circuitry.

16. The integrated circuit as recited in claim 12, wherein the integrated circuit is disposed on a printed circuit board (PCB) of a printed circuit board assembly (PCBA) of components and the components of the PCBA include:
   an inductor having a first terminal coupled to the switch output node of the integrated circuit;
   a capacitor having a first terminal coupled to a second terminal of the inductor and a second terminal coupled to a lower potential; and
   a conductive path coupled between the first terminal of the capacitor and the feedback node of the integrated circuit.

17. The integrated circuit as recited in claim 16, wherein the components of the PCBA further include a digital load coupled to the second terminal of the inductor, the digital load including one of:
   a processor core;
   a graphics processing unit core;
   a communication interface; or
   a memory device.

18. The integrated circuit as recited in claim 16, wherein the components of the PCBA further include a voltage programmer coupled between the input of the DAC and the digital interface, the voltage programmer configured to provide digital input to the DAC based on information received via the digital interface.

19. The integrated circuit as recited in claim 18, wherein the components of the PCBA further include a power management entity that is configured to:
   transmit, to the voltage programmer, a request to configure a target output voltage for the power regulated by the integrated circuit; and
   receive, from the voltage settling detector, an indication that an output voltage of the power regulated by the integrated circuit has settled proximate the target output voltage.

20. The integrated circuit as recited in claim 12, wherein the integrated circuit is embodied as part of a switch-mode power supply, a buck regulator circuit, a boost regulator circuit, or a buck-boost regulator circuit.

21. A method comprising:
   receiving, from a digital-to-analog converter (DAC) of a switching regulator, an indication that a digital-to-analog conversion to configure an output voltage level of the switching regulator is complete;
   detecting, at an output of a modulator of the switching regulator, at least one signal transition indicative of modulator activity; and
   providing, based on the indication received from the DAC and the at least one signal transition at the output of the modulator, a status indication for the switching regulator effective to enable use of power provided by the switching regulator.

22. The method as recited in claim 21, wherein providing the status indication includes asserting a signal or issuing an interrupt to indicate that the switching regulator is ready for operation.

23. The method as recited in claim 21, wherein the status indication indicates that an output voltage of the switching regulator is at approximately the output voltage level configured by the DAC.

24. The method as recited in claim 21, further comprising:
   determining, based on the at least one signal transition, that the modulator is initiating or resuming a mode of operation; and
   wherein the status indication is provided based on the indication received from the DAC and the determined mode of operation of the modulator.

25. The method as recited in claim 24, further comprising:
   receiving, from the DAC and prior to receiving the indication, another indication that the digital-to-analog conversion is pending; and
   providing another status indication that indicates that the output voltage of the switching regulator is not at the output voltage level configured by the DAC.

26. The method as recited in claim 21, wherein:
   the digital-to-analog conversion decreases the output voltage of the switching regulator and the at least one signal transition at the output of the modulator is a first transition after the indication is received from the DAC; or
   the digital-to-analog conversion increases the output voltage of the switching regulator and the at least one signal transition at the output of the modulator indicates resumption, after the indication is received from the DAC, of a pulse-width modulation (PWM) mode of the switching regulator or a pulse-frequency modulation (PFM) mode of the switching regulator.

27. An integrated circuit for controlling a switching regulator comprising:
   switch drive circuitry having an output coupled to a switch drive output node of the integrated circuit;
   a modulator having a first input coupled to a feedback node of the integrated circuit and an output coupled to an input of the switch drive circuitry;
   a digital-to-analog converter (DAC) having an output coupled to a second input of the modulator and an input coupled to a digital interface;
   means for receiving, from the DAC, an indication that a digital-to-analog conversion is complete;
   means for detecting, at the output of the modulator, at least one signal transition; and
   means for providing a status indication for the switching regulator based on the indication received from the DAC and the at least one signal transition of the modulator.

28. The integrated circuit as recited in claim 27, wherein the means for providing a status indication include means for asserting a signal to a power management entity.

29. The integrated circuit as recited in claim 27, further comprising means for generating a digital input for the DAC.

30. The integrated circuit as recited in claim 27, further comprising:
   means for receiving a request to cause the DAC to implement the digital-to-analog conversion to configure an output voltage level of the switching regulator; and
   wherein the means for providing the status indication include means for generating an interrupt to acknowledge that an output voltage of the switching regulator is proximate the output voltage level configured by the digital-to-analog conversion.

* * * * *